United States Patent [19]
Negami et al.

[11] Patent Number: 6,063,156
[45] Date of Patent: May 16, 2000

[54] PRODUCTION METHOD OF METALLIC IRON

[75] Inventors: Takuya Negami, Tokyo; Akira Uragami, Osaka, both of Japan

[73] Assignee: Kabushiki Kaisha Kobe Seiko Sho, Kobe, Japan

[21] Appl. No.: 08/992,791

[22] Filed: Dec. 18, 1997

[30] Foreign Application Priority Data

Dec. 27, 1996 [JP] Japan .................................. 8-351146

[51] Int. Cl.[7] .................................................. C21B 15/00
[52] U.S. Cl. .................................. 75/504; 75/491; 75/576
[58] Field of Search .............................. 75/10.37, 10.38, 75/10.63, 491, 504, 576

[56] References Cited

U.S. PATENT DOCUMENTS

| | | |
|---|---|---|
| 3,953,196 | 4/1976 | Obenchain . |
| 4,517,015 | 5/1985 | Inaba et al. .............................. 75/10.45 |
| 4,551,172 | 11/1985 | Formanek et al. ....................... 75/10.37 |
| 4,738,719 | 4/1988 | McLean et al. ........................... 75/560 |
| 5,891,214 | 4/1999 | Innes et al. ................................ 75/504 |

FOREIGN PATENT DOCUMENTS

| | | |
|---|---|---|
| 0 308 925 | 3/1989 | European Pat. Off. . |
| 25 14 325 | 10/1975 | Germany . |
| 56-19366 | 5/1981 | Japan . |
| 7-54030 | 2/1995 | Japan . |
| WO 94/19497 | 9/1994 | WIPO . |

OTHER PUBLICATIONS

*Patent Abstracts of Japan*, vol. 12, No. 391 (C–537), Oct. 18, 1988, JP 63–137113, Jun. 09, 1988.

Primary Examiner—Prince Willis
Assistant Examiner—Tima McGuthry-Banks
Attorney, Agent, or Firm—Oblon, Spivak, McClelland, Maier & Neustadt, P.C.

[57] ABSTRACT

A method for producing a molten iron from a compact containing a carbonaceous reductant and an iron oxide is carried out extremely efficiently with a simple operation. The compact is supplied to a molten iron bath or a molten slag on the molten iron bath so as to float on the molten iron bath and/or the molten slag such that a part or most of the compact surface is substantially exposed to a high temperature gas atmosphere in the furnace for taking in a reduced iron generated by the reduction of the iron oxide in the compact.

14 Claims, 8 Drawing Sheets

PRODUCTION METHOD OF METALLIC IRON

BACKGROUND OF THE INVENTION

1. Field of the Invention

The present invention relates to the improvement of a technology for obtaining a metallic iron by reducing an iron oxide such as an iron ore with a carbonaceous reductant such as a carbonaceous material by heat. More specifically, the invention relates to an efficient production method of a high purity metallic iron as a molten iron by efficiently reducing the iron oxide to the metallic iron at the time an iron oxide such as an iron ore is reduced with a carbonaceous reductant such as a carbonaceous material by heat to obtain a metallic iron as well as by melting and separating slag components contained in an iron oxide source such as an iron ore as gangue components.

2. Description of the Related Art

As a direct iron-producing method where a reduced iron is obtained by directly reducing an iron oxide such as an iron ore or iron oxide pellets with a carbonaceous material or a reducing gas, a shaft furnace method represented by the Midrex process has been known conventionally. The direct iron-producing method is a method where a reduced iron is obtained by blowing a reducing gas produced from a natural gas or the like into a shaft furnace from a tuyere provided at the bottom thereof so as to utilize the reducing ability for reducing the iron oxide. In recent years, a production method of a reduced iron where a carbonaceous material such as coal is used as a reductant in place of a natural gas has attracted attention. Specifically, the so-called SL/RN method where sintered pellets produced from an iron ore are reduced with coal powders by applying heat in a rotary kiln has already been put into practice.

Another production method of a reduced iron is disclosed in the official gazette of the U.S. Pat. No. 3,443,931 where a carbonaceous material and a powdery iron oxide are mixed to form agglomerates, and heated on a rotary hearth for reduction. The process comprises the steps of mixing a powdery iron ore and a powdery carbon to form agglomerates, and reducing them in a high temperature atmosphere by heat.

A reduced iron produced in the above-mentioned methods is charged into an electric furnace directly or after being prepared as briquettes so as to be used as an iron source. With the recent active movement to recycling iron scrap, a reduced iron obtained in the above-mentioned methods has drawn attention as a diluent of impurities contained in the scrap.

However, since slag components such as $SiO_2$, $Al_2O_3$, CaO contained in the iron oxide such as an iron ore, or in the coal material such as coal used as a material are introduced in an iron oxide obtained in the conventional production method of a reduced iron, the iron content of a product (iron purity of metallic iron) is low. In actual practice, the slag components are separated and eliminated in a subsequent refining process. However, since an increase in the amount of slag not only decreases the yield of refined molten iron, but also has a great influence on the running cost of an electric furnace, an iron-rich reduced iron with a low content of slag components is required. In order to meet the requirement, it is necessary to use an iron-rich iron ore as a material for producing a reduced iron in the above-mentioned conventional production methods of a reduced iron, which narrows the choice of materials for producing iron.

Furthermore, a goal of the above-mentioned conventional methods is to obtain a reduced solid product, as an intermediate product so that additional steps including transportation, storage, briquette formation, and cooling are required before a subsequent refining process. This is disadvantageous since a large energy loss occurs during the steps, and it requires extra energy and a special apparatus for briquetting.

On the other hand, a melting reduction process where an iron oxide is directly reduced to obtain a reduced iron such as the DIOS method is known. In this method, an iron oxide is preliminarily reduced to an iron purity of 30 to 50%, then reduced to a metallic iron by the direct reducing reaction with carbon in an iron bath. However, this method involves problems in that the need of the two steps including the preliminary reduction and the final reduction in the iron bath complicates the operation, and direct contact of a molten iron oxide (FeO) in an iron bath and a refractory causes the significant damage of a refractory in a furnace.

Furthermore, Japanese Examined Patent Publication No. 56-19366 discloses a method where lumps containing a metal oxide, a solid carbonaceous material, and a slag forming material are reduced by heat, a metal generated by the reduction is contained by a slag shell, then the metal and the slag are separated by melting the slag shell. However, a slag sufficient for completely containing the method needs to be produced for preventing the re-oxidization of a metal generated by the reduction in the method. Otherwise with an insufficient content of a slag forming material, the consequent insufficiency in containing the metal results in inevitable re-oxidization of the metal. Besides, a large problem is involved in practice in that a slag with a high FeO concentration can be produced depending on a heat-reduction condition so as to remarkably damage the interior refractory of the equipment.

As heretofore mentioned, realization of a production method of a metallic iron with a small slag component content is extremely important in view of not only increasing the added value of a metallic iron as a product, but also reduction of iron-producing cost using an electric furnace, and flexibility in choosing the materials in producing a metallic iron. Furthermore, it is also significantly important to minimize the iron oxide content in a slag produced in the heating and reducing process as a by-product so as to restrain the damage of the refractory for realizing the iron-producing method industrially.

Japanese Unexamined Patent Publication No. 7-54030 discloses a method for producing steel using sponge iron, partially-reduced iron, self-reducing pellets, or fine iron ore as an iron source as an integrated steel production method to take the place of a blast furnace-converter method, although it is a method belonging to a field different from that of the present invention. That is, the method produces steel by introducing the above-mentioned iron source, in particular a material with a high iron content, into a channel type induction furnace, and maintaining the temperature in the furnace at not lower than the liquidus curve temperature of the product by controlling the quantity of heat supplied to the furnace and the introduction rate of the iron source. It is mentioned that effects can be achieved according to this method in that steel with a carbon content of about 0.1% by weight can be produced continuously in an induction furnace instead of the conventional iron and steel production using both a blast furnace and a converter so that equipment and processes can be simplified, and the energy efficiency can be improved.

However, since reduction with carbon of an iron oxide present in an unreduced iron source, and elimination of carbon taken into the molten iron by reduction (oxidization), should be conducted in the same furnace, it is extremely difficult to control the supply amount of a carbonaceous material or oxygen and the processing temperature. Further, damage to the refractory wall inside the furnace is significant due to existence of iron oxide in a large amount in molten slag generated in a large amount, so that many problems can be expected in terms of both equipment and operation in using this method industrially.

The present inventors paid attention to the situation and studied for developing a technology capable of efficiently obtaining a metallic iron with an extremely high iron purity as a molten iron with a simple processing, even from an iron ore with a relatively low content of an iron component, without the risk of damaging a refractory. As a result, the following method has been developed and disclosed in Japanese Unexamined Patent Publication No. 8-59801.

The prior technology where a metallic iron is produced by reducing an iron oxide compacted with a carbonaceous reductant by heat has the following aspects:

(1) A shell containing a metallic iron is generated and grown by reduction by heat. The reduction is continued until substantially no iron oxide remains in the shell, and agglomerates of generated slag are generated in the shell.

(2) A shell containing a metallic iron is generated and grown by reduction by heat. The reduction is continued until substantially no iron oxide remains in the shell. Heat application is further continued such that slag generated in the shell is discharged outside the metallic iron shell.

(3) A shell containing a metallic iron is generated and grown by reduction by heat. The reduction is continued until substantially no iron oxide remains in the shell. Heat application is further continued such that molten metallic iron and molten slag are separated.

(4) A shell containing a metallic iron is generated and grown by reduction by heat. The reduction is continued until substantially no iron oxide remains in the shell as well as generated slag is agglomerated in the shell, followed by a process of separating the generated slag from the metallic iron.

In order to embody the above-mentioned method (2), molten slag in the shell can be discharged outside the metallic iron shell by partially melting the metallic iron shell. In this case or in order to embody the above-mentioned method (3), carburization may be continued with a carbonaceous reductant present in the metallic iron shell so as to lower the melting point of the metallic iron shell so that a part or the entirety of the metallic iron shell can be melted.

In embodying any of the above-mentioned methods (1) to (4), the reaction of generating a metallic iron can be conducted more efficiently by controlling the maximum heating temperature in the heat reduction process to be not less than the melting point of the generated slag and not more than the melting point of the metallic iron shell. In this reducing process, the purity of the metallic iron to be obtained can be efficiently improved by reducing the iron oxide by a solid phase reduction, and further reducing the same by a liquid phase reduction until substantially no iron oxide, composed mainly of FeO, is present.

In order to accomplish the reduction of an iron oxide in a solid phase effectively, it is necessary that slag generated in the reduction process is melted at a lower temperature with respect to a metallic iron generated by the reduction. Therefore, it is preferable that the content composition of a slag component contained in the iron oxide or the carbonaceous reductant be compacted preliminarily so that the melting point of the generated slag can be lower than the melting point of the reduced iron by adding $Al_2O_3$, $SiO_3$, or CaO in the compacting process as needed.

In the above-mentioned prior technology, the term "reduction is continued until substantially no iron oxide remains in the metallic iron shell" means, on a quantitative basis, "reduction is continued until the content of an iron oxide mainly composed of FeO is 5% by weight or less, preferably 2% by weight or less," in the heat reduction process. From a different point of view, it means that the reduction by heat is continued until the content of an iron oxide mainly composed of FeO in the slag separated from a metallic iron generated in the reducing reaction is preferably 5% by weight or less, more preferably 2% by weight or less.

A metallic iron of an extremely high purity with a metallization ratio of about 95% or higher, or further, of about 98% or higher can be obtained by melting the metallic iron of a high purity and the produced slag obtained in the method so as to be separated by the specific gravity difference. Furthermore, according to the prior invention, since the iron oxide content in the produced slag can be minimized so that damage of the refractory in the furnace derived from the iron oxide can be prevented, the practice of the technology is practical in terms of equipment maintenance.

SUMMARY OF THE INVENTION

It is an object of the present invention to provide a production method and apparatus for efficiently conducting the basic technological concept of the above-mentioned prior invention industrially to develop a method capable of producing molten iron from a compact containing a carbonaceous reductant and an iron oxide extremely efficiently with a simple operation, regardless of whether or not a metallic iron shell can be generated by reduction by heat.

A production method of a metallic iron according to the present invention capable of solving the above-mentioned problems comprises a method of producing a metallic iron by reducing a compact containing a carbonaceous reductant and an iron oxide by heat, wherein the compact is supplied to a molten iron bath or a molten slag on the molten iron bath so as to float on the molten iron bath and/or the molten slag such that a part or most of the compact surface is substantially exposed to a high temperature gas atmosphere in the furnace for reducing the iron oxide in the compact.

In implementing the present invention, the compact is heated by the heat transfer from the molten iron bath and the molten slag, and the radiated heat from the space in the upper part of the furnace. In order to efficiently proceed with reduction by efficiently heating the compact floating on the molten iron bath or on the molten slag from above and below, it is preferable to control the molten slag thickness on the molten iron bath so as to be thin.

For heating from above, examples of preferable methods include a method of supplying an oxygen-containing gas to the space above the molten iron bath, combusting a combustion gas generated from the compact, and utilizing the obtained combustion heat for heating the compact, and a method of supplying a fuel and an oxygen-containing gas above the molten iron bath for combustion, and utilizing the obtained combustion heat for heating the compact. At that time, it is also effective to further improve the reduction efficiency by further introducing a carbonaceous reductant with the compact into the furnace.

On the other hand, the molten iron bath can be heated, utilizing electric energy such as electric arc heating, high frequency heating and induction heating. In order to provide heat transfer from the molten iron bath and the molten slag to the compact efficiently with the heating method, it is preferable that the molten iron bath and the molten slag are agitated by blowing an inert gas into the molten iron bath or by electromagnetic agitating.

Furthermore, in implementing the present invention, a configuration where a molten iron flow is formed at least on the surface portion of the molten iron bath, and the compact is supplied at the upstream side of the flow so that the reduction of the compact proceeds along the flow direction of the molten iron is recommended as a preferable embodiment for continuously conducting the invention. In the case a generated slag has a high melting point or a high viscosity depending on gangue components contained in the compact supplied as a material so that the heat transfer from the molten iron bath to the compact is disturbed, it is also recommended to lower the viscosity of the molten slag by adding a flux as a preferable embodiment.

The compact to be supplied as a material may be in an undried state or in an unreduced state, however it should be supplied after preliminary drying or preliminary reduction. In this case, a high temperature exhaust gas generated in the reduction process can be effectively utilized in the drying or the preliminary reduction. Furthermore, since the high temperature exhaust gas can be effectively utilized by using its sensible heat, or as a gas fuel having combustibility, it is also effective to utilize the electric power obtained by power generation using the high temperature exhaust gas for heating the molten iron bath.

DESCRIPTION OF THE PREFERRED EMBODIMENTS

Hereinafter methods of the present invention will be explained concretely with reference to accompanied drawings showing embodiments. However, the present embodiments are to be considered in all aspects as illustrative and not restrictive so that all changes which come within the meaning and range of equivalency of this specification are intended to be embraced therein.

Figure 1:
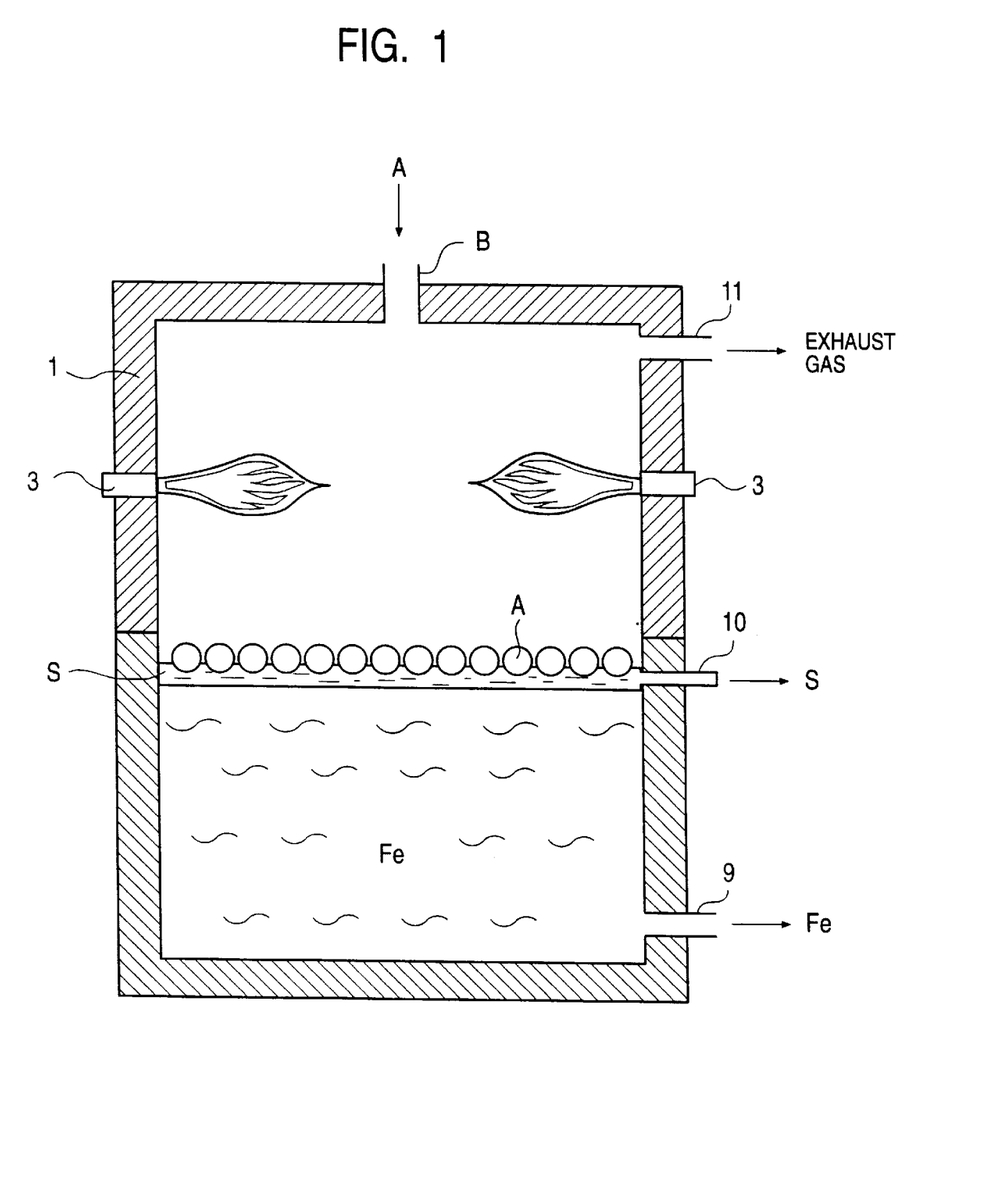
FIG. 1 is a schematic cross-sectional view showing the basic configuration of the present invention.

FIG. 1 is a most simplified schematic vertical cross-sectional view for explaining a production method of a metallic iron and production equipment as an embodiment of the present invention. A carbonaceous reductant and a compact containing an iron oxide (such as pellets) A as materials are supplied from a material introducing opening B on the surface of a molten slag S or a molten iron Fe in a reducing melting furnace 1. The reducing melting furnace 1 is heated from below by a heat source (not illustrated) as well as from above by burners 3 provided on the upper side walls.

The compact A supplied into the furnace 1 is heated by the heat transfer from the molten iron Fe or the molten slag S, the radiation heat from the space above the molten iron bath, and the heat from the burners in the upper space while floating on the molten iron Fe surface or the molten slag S. An iron oxide in the compact A is reduced by a carbonaceous reductant (hereinafter also referred to as carbonaceous material) contained therein. The reduced iron melted by the heat descends owing to the specific gravity difference, to be taken into the molten iron Fe. A slag component generated as a by-product is taken into the molten slag S. As a consequence, since the molten iron Fe and the molten slag S in the furnace 1 increase as reduction and melting of a material compact A continuously supplied proceeds, they are taken out from a molten iron discharging opening 9 and a molten slag discharging opening 10 consecutively.

As an iron oxide source contained in the material compact A, an ordinary iron ore or a preliminarily reduced product thereof can be used. As a carbonaceous reductant, coke, coal or charcoal can be used. A compact of an optional shape such as a pellet obtained by mixing the iron oxide source and particles of the carbonaceous reductant with an appropriate binder with an optional ratio, or a fired product thereof, can be used.

A carbonaceous reductant in the compact A is used for the reduction of an iron oxide under a heating condition as well as used for carburization of an iron generated by the reduction. A solid reduced iron before melting is porous and thus liable to be re-oxidized. However, by maintaining the inside of the reducing melting furnace 1 with a non-oxidizing atmosphere, introducing an extra carbonaceous material in a compacting stage, or introducing a carbonaceous material aside from the compact for reinforcing the reducing atmosphere, re-oxidization of the reduced iron can be prevented. Further, the reduced iron melted by heating descends owing to the specific gravity difference consecutively so as to be taken into the molten iron Fe.

In order to prevent the re-oxidization of the reduced iron by introducing a carbonaceous material to the compact A, the introduction amount of the carbonaceous material needs to be not less than (amount of carbon necessary for reducing the iron oxide+amount of carbon necessary for carburizing the reduced iron+oxidization loss amount). Although the necessary carbon amount varies depending on the kind of an iron oxide or a carbonaceous material, it is preferable that a carbonaceous material of about 20 parts by weight or more based on the carbon content is introduced with respect to 100 parts by weight of an iron content in an iron oxide source to be used in order to securely prevent the re-oxidization of the reduced iron. The upper limit of the carbonaceous material introduction amount is not particularly limited, but since an excessive introduction amount causes a decline of the mechanical strength of the compact so that fragmentation in the handling stage of a material compact or in the introduction stage is liable, an amount of about 45 parts by weight based on the carbon content or less is preferable. In case a greater amount of carbonaceous material is to be used, it is preferable that an optional amount of an additional carbonaceous material is introduced with the compact. A further preferable content of an introduced carbonaceous material is 25 to 40 parts by weight with respect to 100 parts by weight of an iron content in an iron oxide source in view of both re-oxidization prevention of a reduced iron and maintenance of the compact strength.

As mentioned above, in the present invention, a material compact A is heated by the heat transfer from the molten iron Fe, radiation heat from above and the heat from the burners, with electric arc heating, high frequency heating or induction heating adopted for heating the molten iron Fe. In this case, it is preferable that a gas blowing means is provided below the reducing melting furnace 1 for blowing an inert gas to the molten iron, such as a nitrogen gas, or the molten iron Fe bath is agitated by electromagnetic agitating for generating convection, since heat transfer toward the molten iron surface can then be conducted more efficiently.

For heating by burners, a gas fuel such as a hydrocarbon gas, a liquid fuel such as heavy oil, or a solid fuel such as coal can be used. It is also possible to blow in only an oxygen-containing gas such as air from the burners 3 for combustion with an excessive amount of a carbonaceous material contained in the material compact A, or to introduce an additional carbonaceous material with the compact so as to utilize a reducing gas generated in the reducing process, such as CO.

In order to efficiently carry out the above-mentioned reducing and melting process, it is necessary to heat the compact A more efficiently. Therefore, it is necessary that the compact A floats on the molten iron bath and/or on the molten slag such that a substantial part or most of the surface thereof is exposed to a high temperature gas atmosphere in the furnace. Preferably the compact is applied with heat from above and below while floating in contact with the molten iron Fe and the molten slag S without forming lumps. For that reason, it is preferable that the molten slag S floating on the molten iron Fe surface is controlled to be thin.

However, if the introduced compact A becomes lumpy or the molten slag S is thick, the heat transfer from the molten iron Fe bath or the radiation heat from the upper direction to the compact A present inside the lumps is reduced, thereby deteriorating the heating efficiency. Further, with a thick molten slag S, not only does the heat transfer efficiency from the molten iron bath deteriorate but the material compact A also sinks in the molten slag S, so that the radiation heat from above cannot be utilized effectively, thereby further deteriorating the heating efficiency and the reduction efficiency. In view of that, it is preferable that the material compact A introduced into the furnace can come in direct contact with the molten iron bath or the molten slag, with a part or most of the molten compact A substantially exposed to the high temperature gas atmosphere in the furnace, more preferably in a state independent from each other.

It is further preferable that the thickness of the molten slag S is controlled to be thin so that the heat transfer from the molten iron Fe, the radiation heat from above, and heat from the burners are transferred efficiently. Preferably, the thickness of the molten slag S is equivalent to or within twice or three times as large as the particle size of the material compact A. The thickness of the molten slag S can be easily adjusted by controlling the discharging rate of the molten slag S from the discharging opening 10.

The material compact A can be reduced while floating on the molten slag S by CO gas discharged from the compact A by the specific gravity difference and the heat reduction process so that it can receive the heat from above efficiently, and the re-oxidization of the reduced iron can be restrained at a minimum level owing to the generation of the CO gas.

In case the melting point or the melt viscosity of the molten slag S floating on the surface of the molten iron Fe is too high, since the slag S skin on the molten iron Fe bath surface deteriorates the heat transfer efficiency from the molten iron Fe bath to the compact A and makes the continuous discharge of the molten slag S, it is preferable to optionally add a flux (such as CaO and MgO) for lowering the melting point and improving the flowability of the molten slag S.

By adjusting the molten slag S to have a low melting point and a high flowability as mentioned above, the heat transfer efficiency from the molten iron Fe can be approved and the FeO contained in a slag generated as a by-product in the reducing process of a compact A can be reduced, so that damage to the refractory wall due to FeO can be prevented effectively.

Exhaust gas discharged from the discharging opening 11 provided in the upper part of the reducing melting furnace 1 in the embodiment shown in FIG. 1 has a considerable reducing ability even at a high temperature. It is recommended to utilize the exhaust gas for drying or preliminarily reducing a material compact A as later described, to transfer to thermal electric power generation equipment provided adjacently for utilizing the sensible heat, or to utilize as a fuel for electric power for heating the reducing melting furnace 1 as preferable embodiments of this method.

Figure 2:
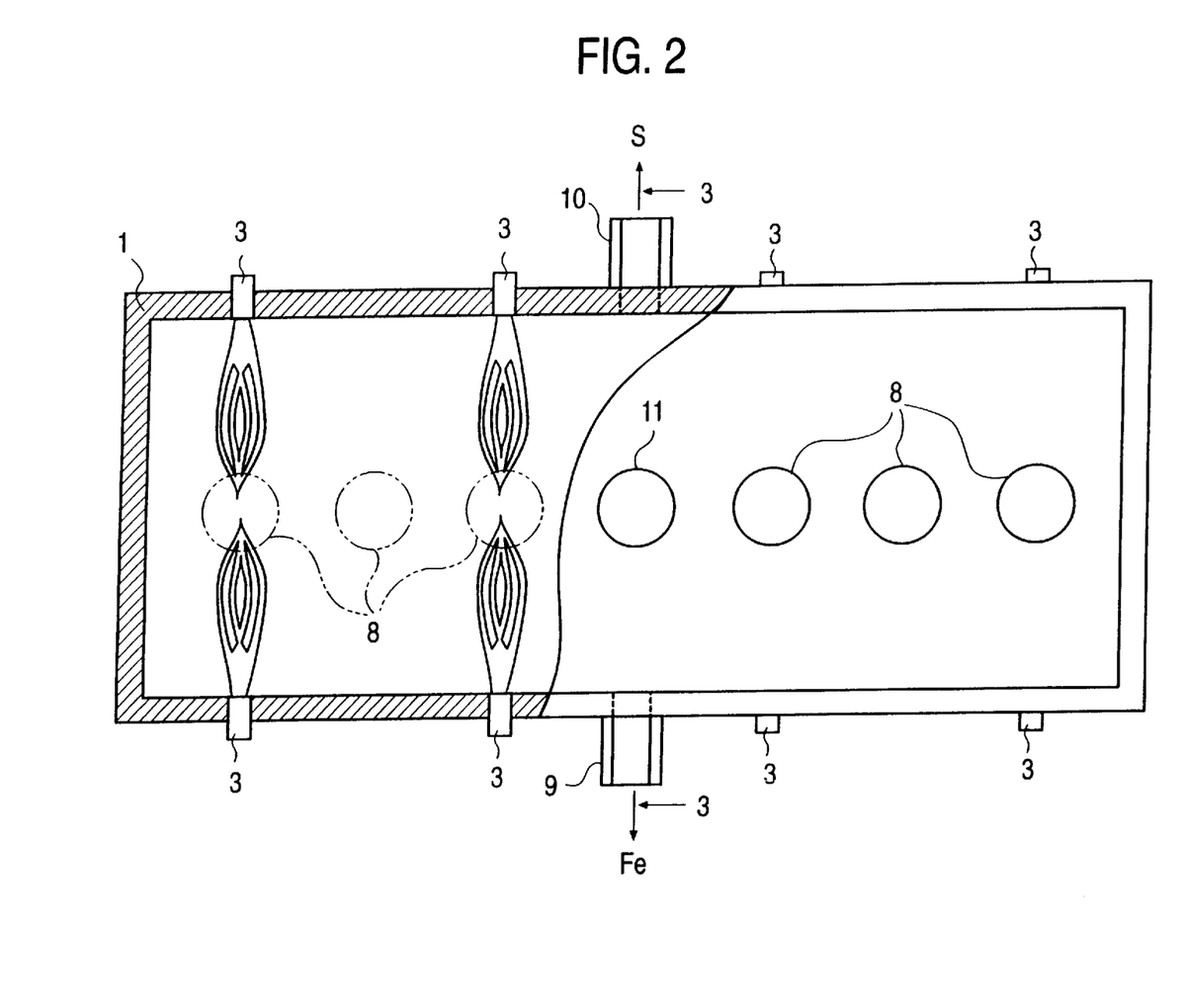
FIG. 2 is a partially-exploded plan view showing another embodiment of the present invention.
Figure 3:
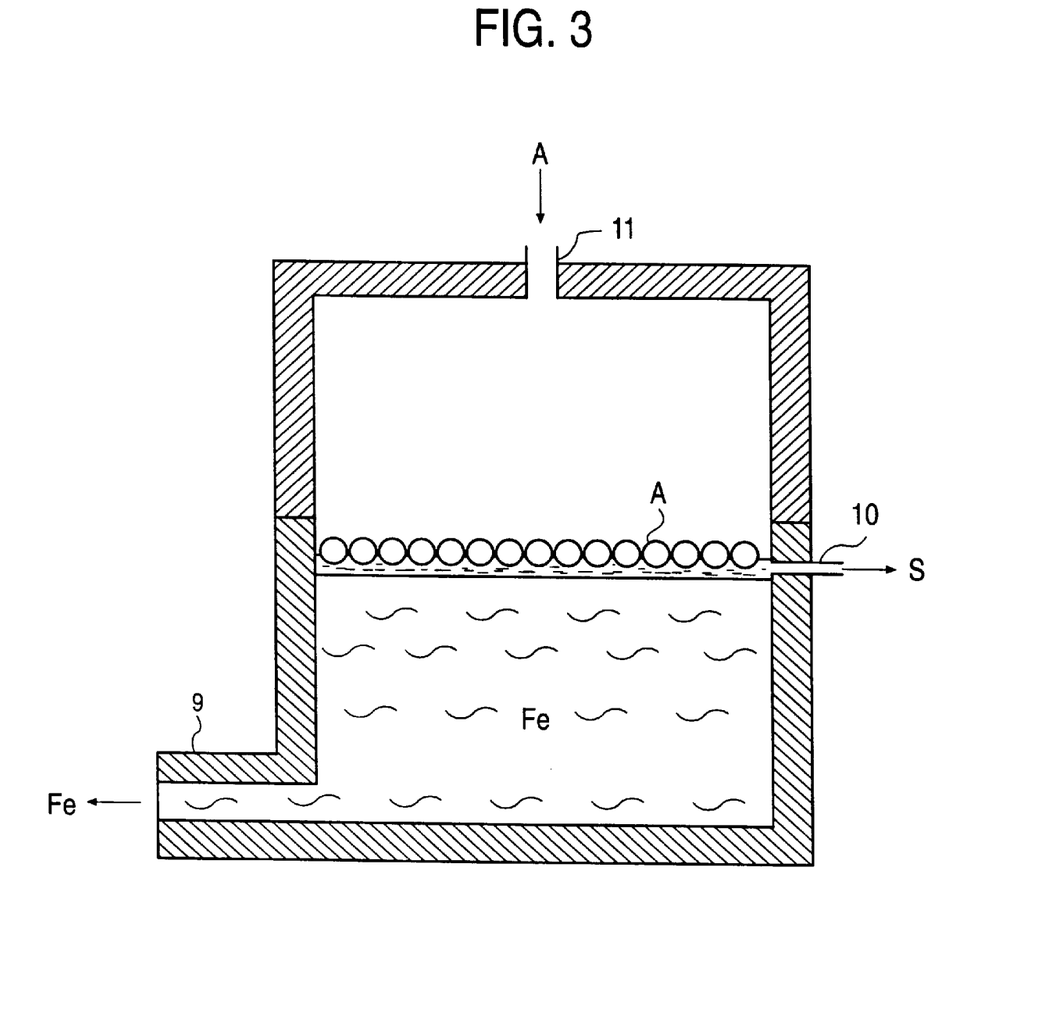
FIG. 3 is a cross-sectional view taken along line III—III of FIG. 2.

FIG. 2 is a partially-exploded plan view showing another method and apparatus of the present invention. FIG. 3 is a cross-sectional view taken on the line 3—3 of FIG. 2. This embodiment is substantially the same as the embodiment shown in FIG. 1 except that the reducing melting furnace 1 has a horizontal shape having an enlarged surface of the molten iron Fe bath for reducing and melting, a plurality of material introducing openings 8 are provided, and a plurality of burners 3 are provided for heating the entirety evenly.

Figure 4:
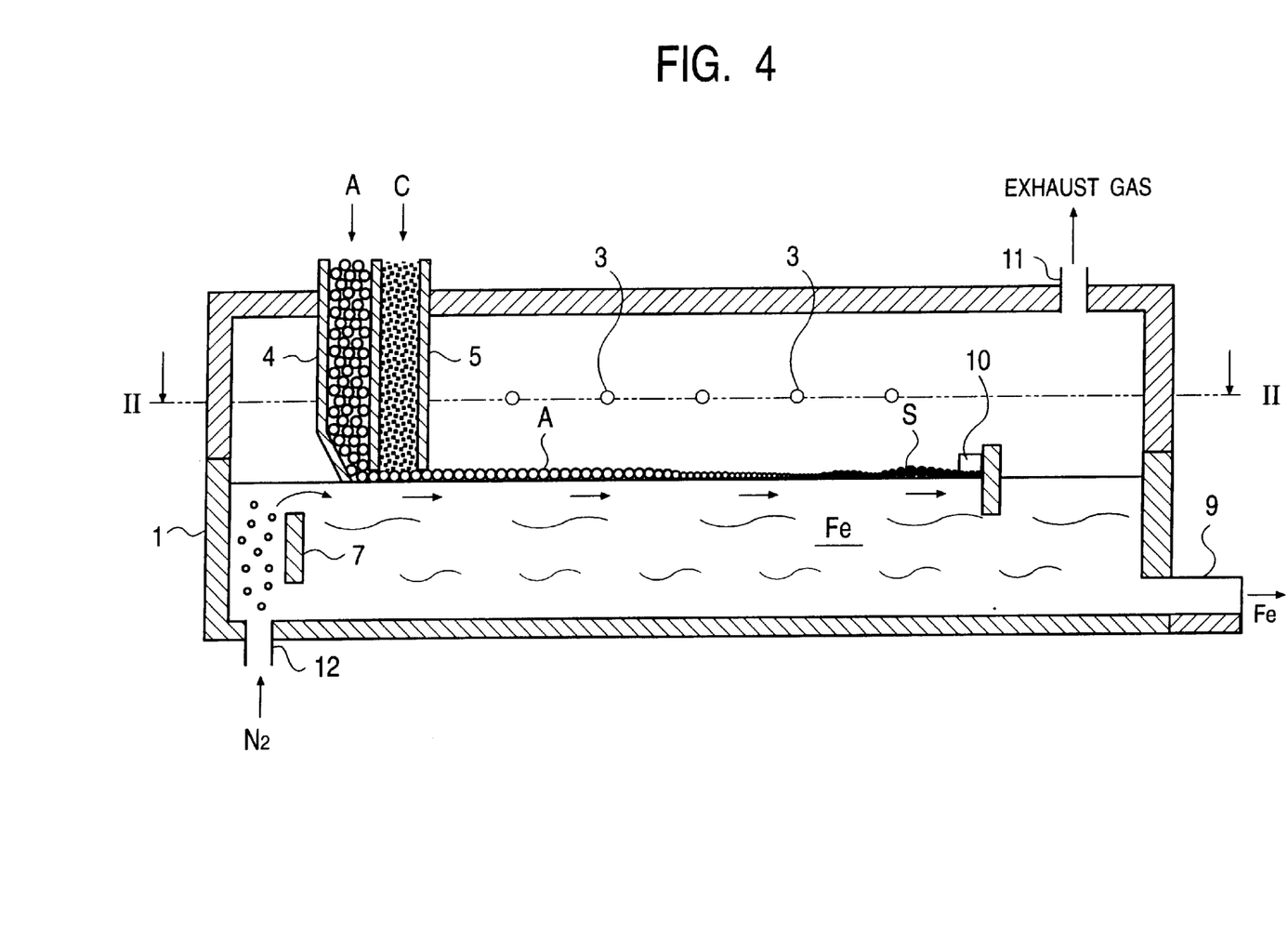
FIG. 4 is a schematic cross-sectional view showing still another embodiment of the present invention viewed from the side.
Figure 5:
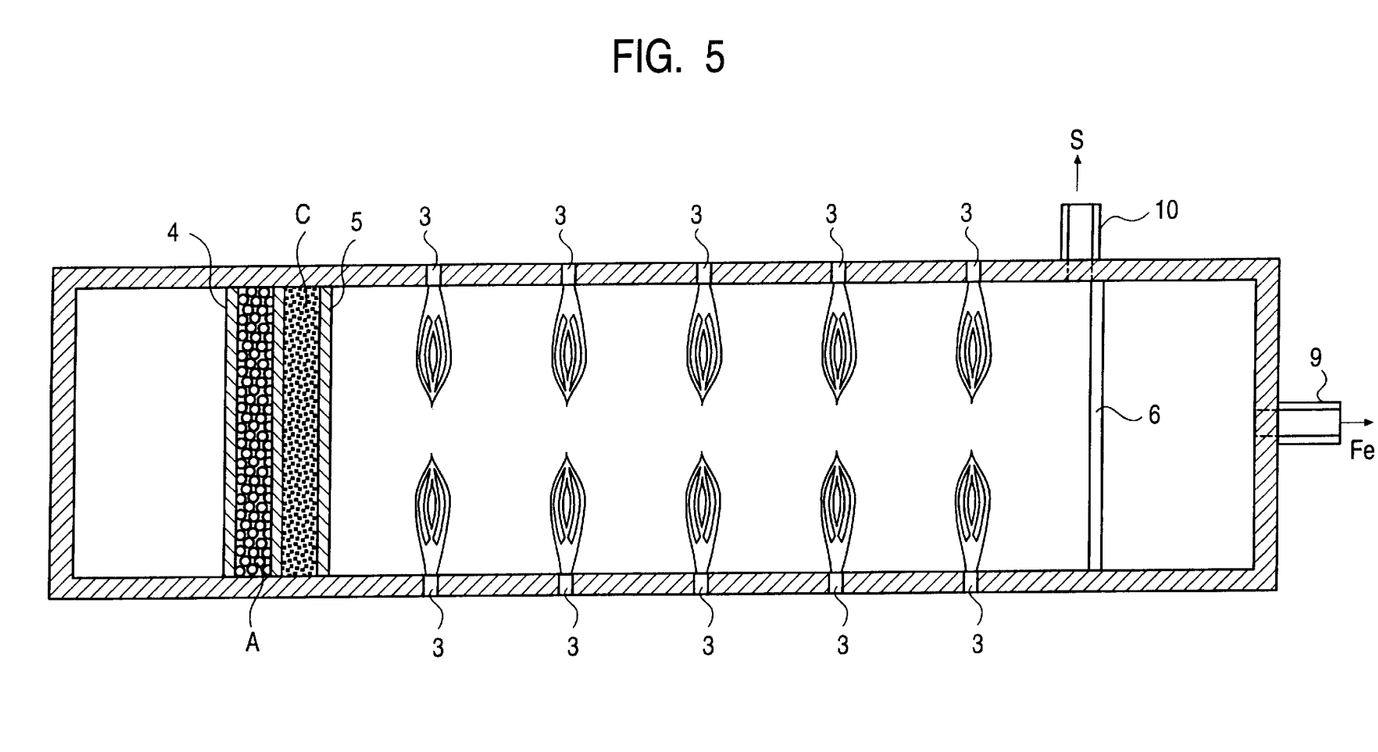
FIG. 5 is a cross-sectional view taken along line V—V of FIG. 4.

FIGS. 4 and 5 are cross-sectional views showing still another embodiment of the present invention. FIG. 4 is a cross-sectional view viewed from the side, and FIG. 5 is a cross-sectional view viewed from the planar direction. In this embodiment, a molten iron Fe is accommodated in a horizontal reducing melting furnace 1, with the molten iron Fe bath heated by a heating means (not illustrated). A plurality of burners 3 are provided in the space above the molten iron Fe bath along the longitudinal direction. And further, a supply portion 4 for a material compact A and a supply portion 5 for a carbonaceous material C for promoting the reduction of FeO in the slag and prevention of re-oxidization are provided at the upstream side so as to continuously supply the material compact A and the carbonaceous material C onto the molten iron Fe bath.

A submerged weir 6 is provided at the surface of the molten iron Fe bath at the downstream side of the reducing melting furnace 1. A molten slag discharging opening 10 is opened immediately at the upstream side of the submerged weir 6. A molten iron discharging opening 9 is provided at the lower part at the most downstream side. Therefore, by continuously introducing a material compact A and a carbonaceous material C and discharging a molten iron Fe and a molten slag S generated according to the introduction amount from the respective discharging openings, flow of the molten iron Fe and the molten slag S in the furnace 1 is formed from the introducing side to the discharging side. In this embodiment, in order to have the flow occur more smoothly, an inert gas blowing opening 12 and a partition wall 7 are provided in the lower part at the most upstream side of the molten iron Fe bath so as to promote the surface flow of the molten iron Fe toward the downstream side by forming the rising flow of bubbles of an inert gas between the partition wall 7 and the upstream side wall of the furnace 1.

The material compact A introduced from the supply portion 4 is heated from the molten iron Fe bath, the radiation heat from the upper space and heat from the burners so that heating and reducing are conducted while floating downstream on the molten iron Fe bath. The generated reduced iron is further applied with heat, to be melted and taken into the molten iron Fe bath, and continuously discharged from the discharging opening 9. On the other hand, a slag generated as a by-product is taken into the slag S present on the molten iron surface, interrupted by the submerged weir 6, and discharged from the discharging opening 10 consecutively. It is preferable to supply a flux with the compact A or from another supply portion to lower the melting point of the molten slag S on the molten iron Fe surface and to improve flowability since the efficiency in heating the compact from above and below can be further improved as mentioned above. Furthermore, since the discharge of the molten slag S from the molten iron surface position at the most downstream side can be facilitated, and moreover, the control of the molten slag S thickness on the molten iron Fe bath can be further facilitated by lowering the viscosity of the molten slag S by adding the flux, it is preferable.

According to this method, since reduction and melting can be conducted continuously while a material compact A flows on the molten iron surface to the downstream side so that it is taken into the molten iron Fe and the molten slag S respectively to be discharged continuously, continuous operation can be conducted extremely efficiently. Since the exhaust gas to be discharged from the discharging opening 11 provided in the upper wall at the most downstream side of the reducing melting furnace 1 has a reducing ability at a high temperature as mentioned above, it can be used for drying or preliminarily reducing the material compact A, or can be utilized as a heating electric power source of the reducing melting furnace 1 by being supplied to a thermal electric power generation equipment for driving a boiler by the sensible heat, or as a gas fuel.

Figure 6:
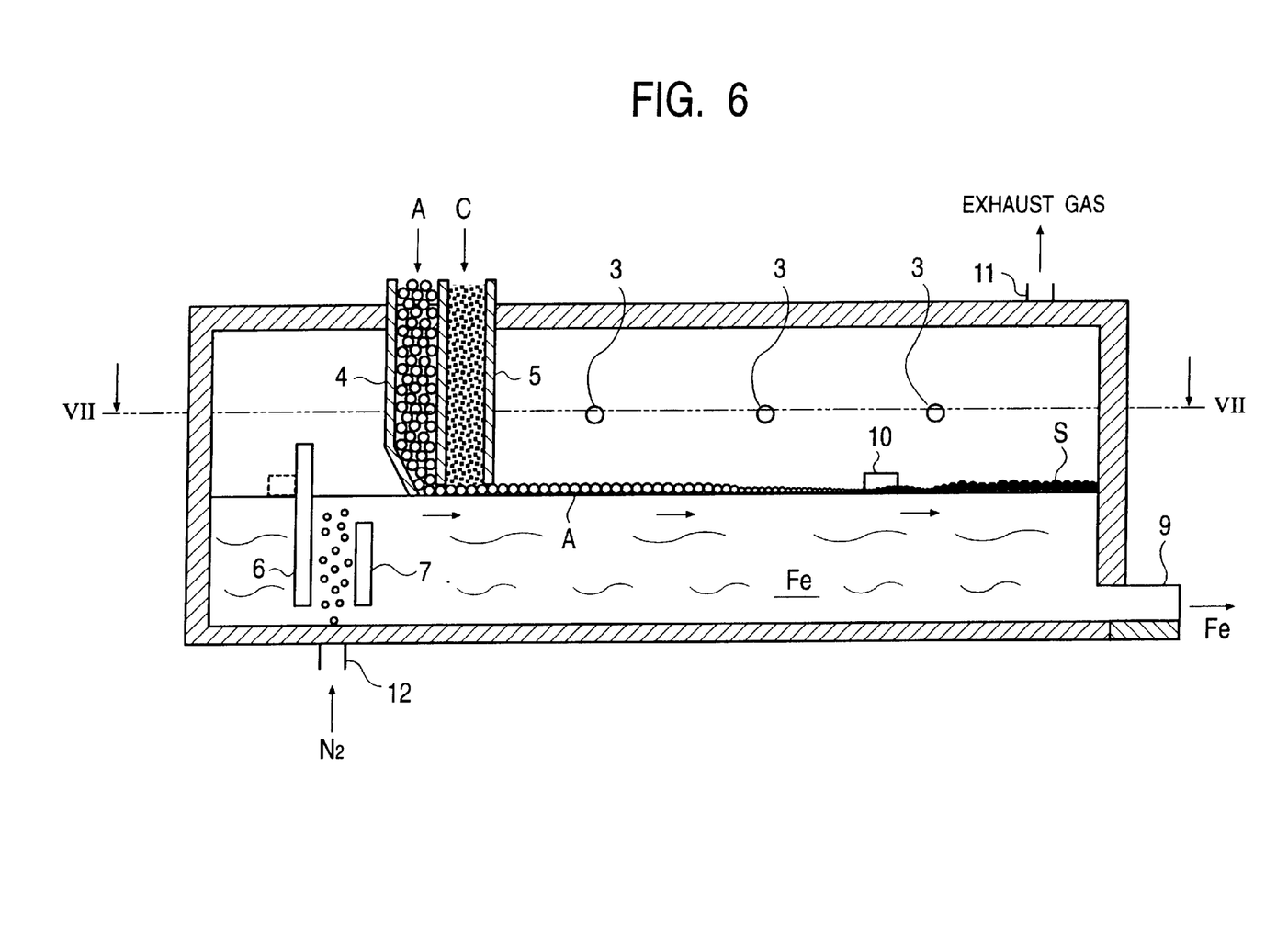
FIG. 6 is a schematic cross-sectional view showing still another embodiment of the present invention viewed from the side.
Figure 7:
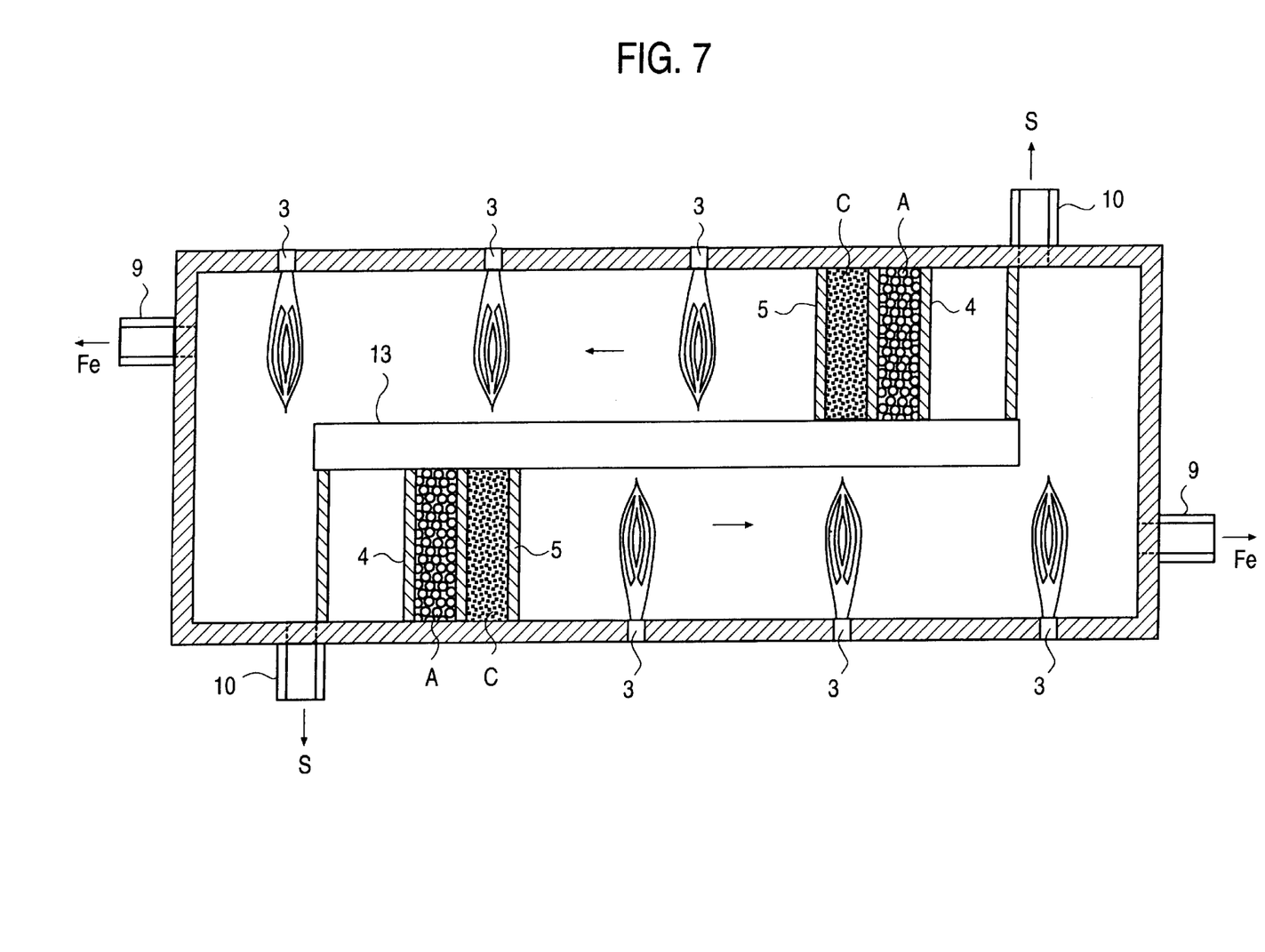
FIG. 7 is a cross-sectional view taken along line VII—VII of FIG. 6.

FIGS. 6 and 7 are schematic cross-sectional views showing still another embodiment of the present invention viewed from the side and the planer direction. This embodiment is substantially the same as the embodiment shown in FIGS. 4 and S except that the inside of the reducing melting furnace 1 is divided in two with a vertical partition wall 13 to form molten metal Fe flows in the opposite directions on opposite sides of the partition wall 13, with material compact supply portions 4a, 4b and carbonaceous material supply portions 5a, 5b provided in the respective upstream sides, discharging openings for the molten iron Fe 9a, 9b and discharging openings for the molten slag 10a, 10b provided in the respective downstream sides, and a plurality of heating burners 3 provided at the upper part of the furnace 1. In this embodiment, since heat diffusion from the partition wall 13 can be prevented to improve the heat efficiency as a whole, and further, reducing and melting can be conducted in a relatively narrow channel while forming a stable molten iron Fe flow, a further stable operation can be achieved, and thus it is preferable.

Figure 8:
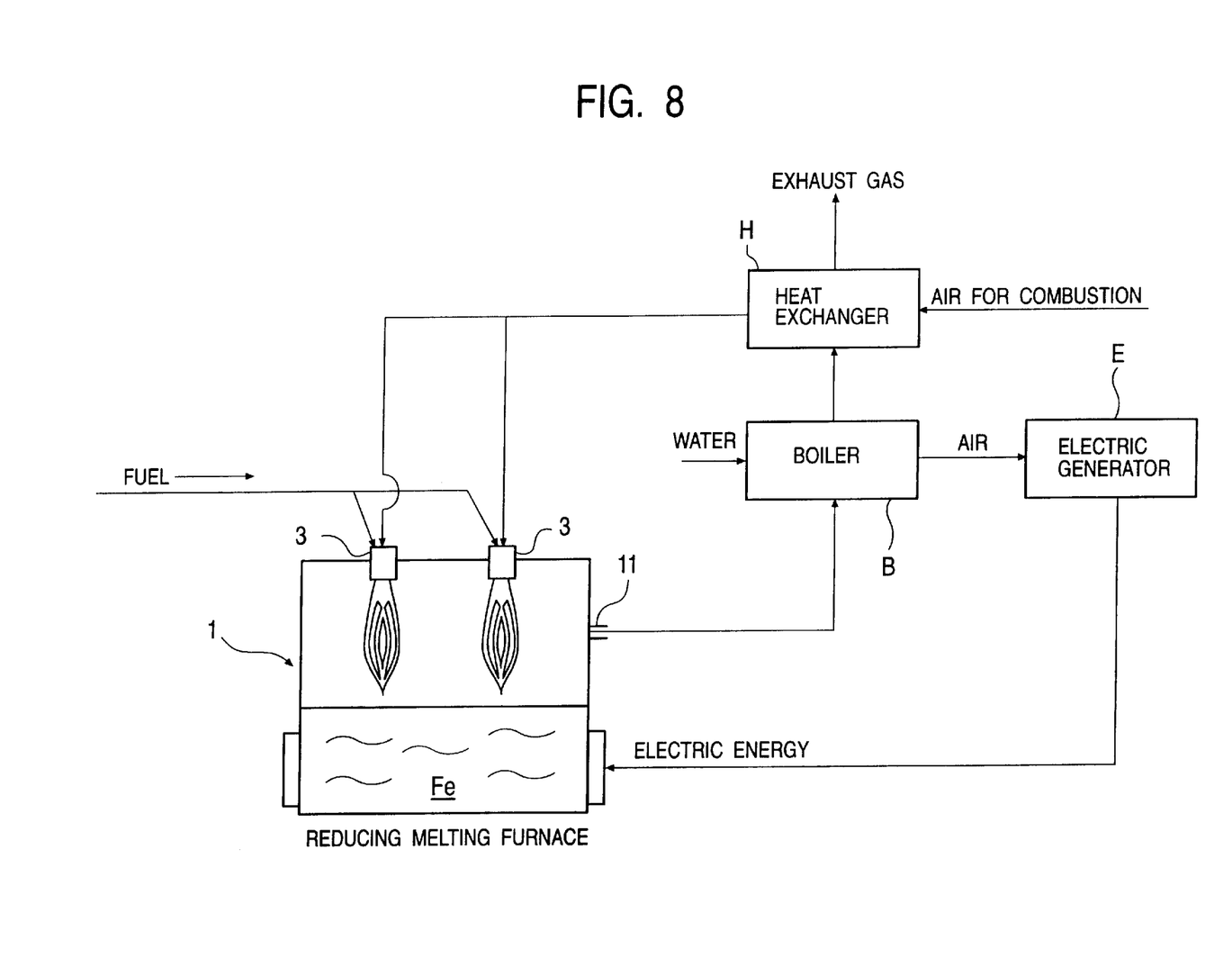
FIG. 8 is a schematic flow chart showing an effectively utilizing system of an exhaust gas preferably adopted in the present invention.

FIG. 8 is a flow chart showing an embodiment of equipment capable of effectively utilizing exhaust gas of a high temperature discharged from the reducing melting furnace 1 as the heating electric power source of the apparatus. By supplying the exhaust gas discharged from the exhaust gas discharging opening 11 of the reducing melting furnace 1 to a boiler B, heating water supplied to the boiler B for generating vapor, and driving an electric generator E by the vapor for generating electric power. The electric power is utilized as the heating electric power source of the reducing melting furnace 1. The exhaust gas having thermal energy discharged from the boiler B is supplied to a heat exchanger H for exchanging heat with the air for combustion supplied to the combustion burners 3 of the reducing melting furnace 1 for further utilizing thermal energy effectively.

Since the exhaust gas still has a slight reducing ability, it can be utilized as an auxiliary fuel for electric power generation.

Accordingly, by providing such equipment for effectively utilizing a reducing gas to reducing and melting equipment of the present invention, the energy consumption of the equipment as a whole can be kept at a minimum level.

According to the present invention with the above-mentioned configurations, in combination with the novel production technology of a metallic iron proposed in the prior invention, an iron oxide source including not only preliminarily reduced iron ore but also unreduced iron ore can be efficiently reduced to a molten iron of a high purity with relatively simple equipment and operation so that continuous operation of the direct reducing iron production method can be realized in the practical use. Moreover, according to the present invention, a material compact is reduced and melted while floating on a molten iron bath and/or a molten slag with a part or most of the surface of the material compact substantially exposed to a high temperature gas atmosphere in the furnace so that heating and reducing can be conducted efficiently with the heat transfer from the molten iron, the radiation heat from the upper space, and the heat from the burners. Since the generated reduced iron is taken into the molten iron and the generated slag is taken into the molten slag, they can be separated automatically and efficiently. Since FeO, which may be contained in a slag generated as a by-product in the reducing process can be reduced quickly with carbon contained in the molten iron in the saturated state, damage in the refractory wall in the furnace by FeO can be prevented. As a consequence, since the iron component content in the molten slag separated and discharged can be restrained significantly, the iron content loss can be curbed so that the yield of the iron component with respect to the material introduction amount can be remarkably improved. As heretofore mentioned, various effects can be achieved by the present invention.

What is claimed is:

1. A production method of a metallic iron in a furnace by reducing a compact containing a carbonaceous reductant and an iron oxide by heat, comprising the steps of:

supplying the compact directly to a molten iron bath or to a molten slag on the molten iron bath, in a furnace having a high temperature atmosphere;

heating the supplied compact from both above and below the furnace; and causing the supplied compact to float on the molten iron bath and/or the molten slag such that at least a part of the compact surface is substantially exposed to the high temperature gas atmosphere in the furnace, until the iron oxide in the compact is substantially reduced.

2. The production method according to claim 1, further controlling the thickness of the molten slag on the surface of the molten iron bath to be within two to three times the particle size of the compact; and exposing a substantial portion of the floating compact to the high temperature gas atmosphere.

3. The production method according to claim 1, including the step of heating the floating compact by heat transfer from the molten iron bath or from the molten iron bath and the molten slag, and by radiation heat from an upper space in the furnace.

4. The production method according to claim 1, including the step of supplying an oxygen-containing gas and a fuel above the molten iron bath for combustion so as to provide combustion heat for heating the compact.

5. The production method according to claim 1, including the steps of supplying an oxygen-containing gas above the molten iron bath, and combusting a combustion gas generated from the compact so as to provide combustion heat for heating the compact.

6. The production method according to claim 1, including the step of drying the compact before the compact is supplied to the furnace.

7. The production method according to claim 6, including the step of using a high temperature exhaust gas generated in the reduction process for drying the compact.

8. The production method according to claim 1, including the step of supplying a carbonaceous reductant onto the molten iron bath or the molten slag on the molten iron bath.

9. The production method according to claim 1, including the step of heating the floating compact evenly by agitating the molten iron bath.

10. The production method according to claim 8, including the step of agitating the molten iron bath by blowing an inert gas into the molten iron bath.

11. The production method according to claim 1, including the step of causing a flow of the molten iron at least on a surface portion of the molten iron bath, wherein the compact is supplied at an upstream side of the flow and is reduced while moving along the flow direction of the molten iron.

12. The production method according to claim 1, including the step of adding a flux to the compact for lowering the melt viscosity of the molten slag.

13. The production method according to claim 1, including the steps of generating electric power using a high temperature exhaust gas generated in the reduction process, and using the obtained electric power for heating the molten iron bath.

14. The production method according to claim 1, including the step of using a high temperature exhaust gas generated in the reduction process for preliminarily reducing the compact.

* * * * *